No. 635,010. Patented Oct. 17, 1899.
H. C. BUNDY.
MEANS FOR TESTING SIGNALING CIRCUITS.
(Application filed Mar. 16, 1899.)

(No Model.)

Witnesses:
Jas. F. Coleman
Jno. R. Taylor

Inventor
Henry C. Bundy
by Pyper, Edmonds & Dyer
Attys.

UNITED STATES PATENT OFFICE.

HENRY C. BUNDY, OF WATERTOWN, NEW YORK, ASSIGNOR TO THE GAME-WELL FIRE-ALARM TELEGRAPH COMPANY, OF NEW YORK, N. Y.

MEANS FOR TESTING SIGNALING-CIRCUITS.

SPECIFICATION forming part of Letters Patent No. 635,010, dated October 17, 1899.

Application filed March 16, 1899. Serial No. 709,378. (No model.)

*To all whom it may concern:*

Be it known that I, HENRY C. BUNDY, a citizen of the United States, residing at Watertown, in the county of Jefferson and State of New York, have invented certain new and useful Improvements in Means for Testing Signaling-Circuits, of which the following is a specification.

My invention relates to improved means for testing fire-alarm and police telegraph and other closed-circuit signaling systems. In such systems street-boxes are employed, provided with circuit-breaking devices operated by hand or by a motor and arranged to break the circuit with a desired permutation corresponding to the box-number. Usually each box is provided with a bell arranged in the box-circuit and which responds to the breaks therein.

My invention is particularly designed for the production of simple means by which the box-circuits of fire-alarm and police telegraphs and similar electrical systems may be tested without affecting or disturbing the main line in any way.

My invention consists, generally, in interposing in shunt with a box mechanism or other circuit to be tested a resistance of sufficient capacity to prevent a short circuit around the break-wheel, whereby on starting the box-train current will be shunted through the break-wheel to cause the bell to sound, indicating the correct condition of the circuits, but without affecting the main line. Preferably the resistance which is thus interposed in shunt with the circuit to be tested is carried in a plug or switch, which may cooperate effectively with the usual lightning-arrester.

In order that my invention may be better understood, attention is directed to the accompanying drawings, forming a part of this invention, and in which—

Figure 1:
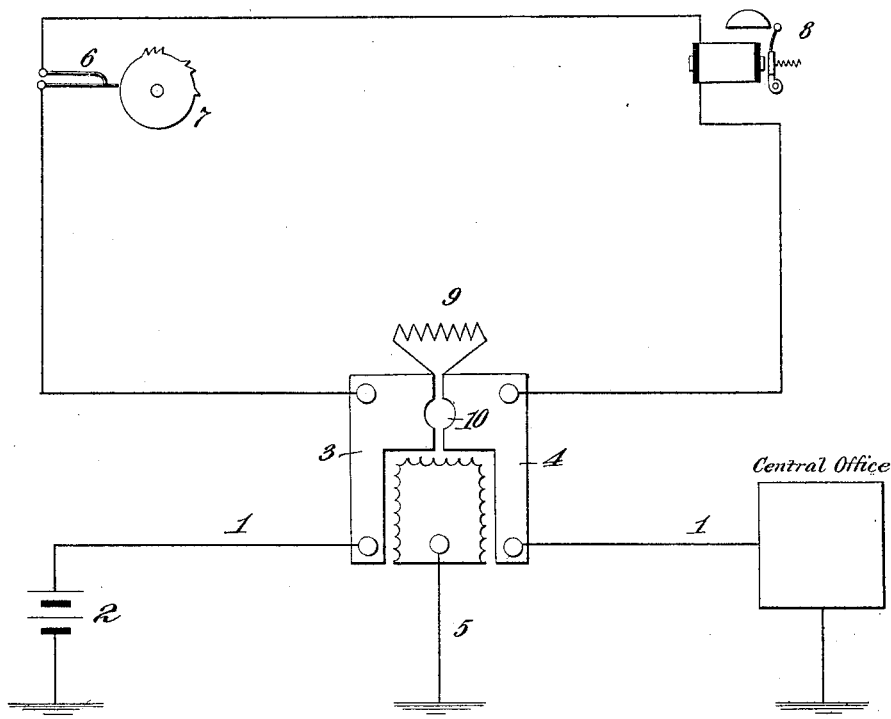
Figure 2:
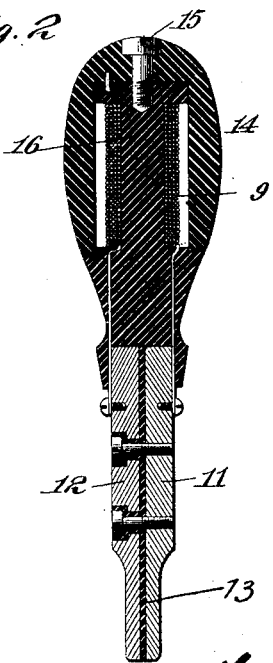

Figure 1 is a diagram showing the circuits of a street-box of a police or fire-alarm telegraph system with my present improvements applied thereto, and Fig. 2 a longitudinal section through a plug embodying the preferred construction.

In both of the above views corresponding parts are represented by the same numerals of reference.

1 is a main line having a battery 2 and connected to the plates 3 4 of an ordinary lightning-arrester in a street-box. This lightning-arrester is provided with a ground-circuit 5, as is common. Connecting the plates 3 4 of the lightning-arrester is a box-circuit, including the contact-pens 6 of a break-wheel 7 and a bell 8. The line is normally closed at the contact-pens 6. The starting of the break-wheel by the operation of a suitable spring-motor will cause a series of breaks to be established in the line, thus signaling to a central office.

In order to test the box-circuit, including the contact-pens 6, bell-magnet 8, and any other suitable appliances which may be located in the box, I interpose a resistance 9 in shunt with the circuit to be tested. This resistance is sufficient to prevent a short circuit around the contact-pens 6, whereby when the break-wheel 7 is started sufficient current will energize the bell-magnet 8 to sound it, thereby indicating the correct condition of the box-circuit. Obviously the breaking of the box-circuit is purely local and does not affect in any way the continuity of the line 1. Preferably the resistance 9 is carried in a plug adapted to bridge across the plates 3 4 of the lightning-arrester, said plug being inserted in the opening 10 and being shown in Fig. 2. This plug comprises two sections 11 and 12, having an insulating layer 13 between them adapted to be inserted in the opening 10. The handle of the plug is provided with a removable top 14, being held in place by a screw 15 and containing a bobbin 16, around which the resistance-wire 9 is wound. This resistance-wire is connected across the two sections 11 and 12, whereby its resistance will be interposed between the plates of the lightning-arrester when the plug is inserted in position in the opening 10.

Having now described my invention, what I claim as new, and desire to secure by Letters Patent, is as follows:

1. Means for testing a section of a normally-closed circuit, said section having a break device and bell therein, and comprising a resistance arranged in shunt to the break device and bell, and sufficient to prevent a short circuit thereof, substantially as set forth.

2. The combination with a street-box mechanism of a normally-closed signaling-circuit, of a separate removable resistance device adapted to be interposed in shunt to said mechanism, and of sufficient capacity to prevent a short circuit thereof, substantially as set forth.

3. The combination with a street-box mechanism of a normally-closed signaling-circuit, of a break device and a bell in the box-circuit, and a resistance arranged in shunt to the break device and bell, substantially as set forth.

4. The combination with a street-box mechanism of a normally-closed signaling-circuit, of a lightning-arrester with which the box-circuit is connected, and a removable resistance arranged across the sections of the lightning-arrester, and in shunt with the box-circuit, substantially as set forth.

5. The combination with a street-box mechanism of a normally-closed signaling-circuit, of a lightning-arrester, the sections of which are connected to said circuit, and a removable plug carrying a resistance arranged to engage the sections of said lightning-arrester, whereby said resistance will be interposed in shunt with the street-box circuit, substantially as set forth.

This specification signed and witnessed this 7th day of March, 1899.

HENRY C. BUNDY.

Witnesses:
JOHN B. MUZZY,
G. L. BAXTER.